US008024275B2

(12) United States Patent
Stone (10) Patent No.: US 8,024,275 B2
(45) Date of Patent: Sep. 20, 2011

(54) METHOD AND SYSTEM FOR MONITORING A BUSINESS PROCESS

(75) Inventor: Jeremiah E. Stone, San Francisco, CA (US)

(73) Assignee: SAP AG, Waldorf (DE)

( * ) Notice: Subject to any disclaimer, the term of this patent is extended or adjusted under 35 U.S.C. 154(b) by 525 days.

(21) Appl. No.: 11/733,625

(22) Filed: Apr. 10, 2007

(65) Prior Publication Data

US 2008/0255891 A1    Oct. 16, 2008

(51) Int. Cl.
*G06Q 10/00* (2006.01)
(52) U.S. Cl. .................... 705/301; 705/300; 705/400
(58) Field of Classification Search .................... 705/34, 705/400, 7
See application file for complete search history.

(56) References Cited

U.S. PATENT DOCUMENTS

| | | | | |
|---|---|---|---|---|
| 6,393,406 | B1* | 5/2002 | Eder | 705/7 |
| 7,149,700 | B1* | 12/2006 | Munoz et al. | 705/8 |
| 7,353,212 | B1* | 4/2008 | Darcy et al. | 705/400 |
| 2001/0041996 | A1* | 11/2001 | Eder | 705/7 |
| 2002/0029224 | A1* | 3/2002 | Carlsson | 707/104.1 |
| 2005/0071266 | A1* | 3/2005 | Eder | 705/38 |
| 2005/0119922 | A1* | 6/2005 | Eder | 705/7 |
| 2005/0120010 | A1* | 6/2005 | Philpott et al. | 707/3 |
| 2005/0187854 | A1* | 8/2005 | Cutler et al. | 705/37 |
| 2006/0015424 | A1* | 1/2006 | Esposito et al. | 705/35 |
| 2007/0276743 | A1* | 11/2007 | Zalta et al. | 705/34 |
| 2008/0140469 | A1* | 6/2008 | Iqbal et al. | 705/7 |
| 2008/0235153 | A1* | 9/2008 | Tombs et al. | 705/36 R |
| 2008/0235155 | A1* | 9/2008 | Thywissen | 705/400 |

OTHER PUBLICATIONS

"Project Scheduling-Thoery and Practice", Herroelen, Willy, Production and Operations Management, Vol. 14, No. 4, Winter 2005, pp. 413-432.*

* cited by examiner

*Primary Examiner* — Rutao Wu
(74) *Attorney, Agent, or Firm* — Blakely Sokoloff Taylor & Zafman, LLP (57) ABSTRACT

A method and system for monitoring and fine tuning a business process are disclosed. A system for monitoring and fine tuning a business process, according to an embodiment of the invention, includes a process cost definition engine to generate and define a cost definition, or function, for each sub-process that is part of a business process. The system may also include a process cost calculator for calculating the cost for each sub-process that is part of a business process, based on the cost function associated with the sub-process. The system may also include a display engine to display various views and communicate data generated by the system to various users of the system.

18 Claims, 11 Drawing Sheets

METHOD AND SYSTEM FOR MONITORING A BUSINESS PROCESS

FIELD OF THE INVENTION

The present invention relates generally to monitoring a business process, and in particular, to a method and system to measure the efficiency of, and fine tune, a business process.

BACKGROUND OF THE INVENTION

A business process is a set of logically related tasks performed to achieve a defined business outcome. Business processes are generally identified in terms of their beginning and end points, sub-processes, interfaces, and the organizational units involved. Often a business process tends to cross organizational boundaries. For example, a business process may occur across or between organizational subunits, such as different departments of a business enterprise. Examples of business processes include: developing a new product; ordering goods from a supplier; creating a marketing plan; processing and paying an insurance claim; etc.

Both large and small business enterprises are challenged with managing a wide variety of business processes. Because the success of a business enterprise is often dependent on the efficiency of its business processes, a significant amount of attention is given to improving business processes. In fact, each year, business enterprises spend millions of dollars in consulting fees in efforts to engineer, and/or re-engineer, their critical business processes. Many business enterprises, particularly smaller businesses, regularly perform business processes without formally identifying and managing the processes.

In an attempt to help businesses better manage their business processes, software developers have developed business process software (e.g., *SAP Business Workflow,* from SAP AG of Walldorf, Germany) to model and manage business processes. One of the goals of business process software is to "push the intelligence of the processors into the machine," allowing a business to cut processing costs of paper-based processes by using existing information technology infrastructure to create, route, and process work items formerly associated with paper based business processes. For example, using business process software, a business can capture and manage all of the essential data for a particular business process, and thereby improve the means by which they identify and allocate resources for a business process, schedule the sub-processes, or tasks, required to complete a particular business process, and communicate effectively between the role players involved with the process.

Despite the overall advantages that are realized using present business process software, present software solutions do not adequately address several problem areas. For example, one problem with current business process software applications is their inability to meaningfully monitor the overall efficiency level of a business process. For example, current software solutions do not provide the ability to pinpoint problem areas, or bottlenecks, that delay or otherwise negatively impact on the performance of a process.

Another problem with current business processes software is the inability to effectively communicate the overall importance of an individual sub-process, or task, to the processors directly involved in performing that sub-process. For example, it is often difficult for businesses to impart to the individual actors in a business process the urgency or order of importance of one task compared to others from the point of view of the business as a whole. Rather, process actors prioritize tasks chronologically, or according to the whims of their immediate supervisors whose priorities are, by nature of the business environment, rarely well aligned with the ultimate strategy of the business as a whole. Currently, prioritization schemes rely on deadlines or arbitrary prioritization schemes.

SUMMARY OF THE INVENTION

A method and system for monitoring a business process are provided. According to an embodiment of the present invention, a process cost definition engine generates a cost definition (e.g., a cost function) for each sub-process that is part of a business process. The cost definition may be a function of real-time and/or previously stored environment data. A process cost calculator calculates the cost associated with each sub-process based on the cost definition associated with each sub-process. A display engine displays the cost information calculated by the process cost calculator in a business process monitoring console.

Other aspects of the present invention will be apparent from the accompanying figures and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and system for measuring the efficiency of a business process are described. In the following description, for purposes of explanation, numerous specific details are set forth in order to provide a thorough understanding of the present invention. It will be evident, however, to one skilled in the art that the present invention may be practiced without these specific details.

According to one embodiment of the invention, a business process management tool provides managers of a firm a way to communicate the importance of work items to the individual actors assigned to the work items (e.g., the employees assigned to perform the work items). Accordingly, the present invention, in one embodiment, provides a feedback loop between business process owners and business process actors. The business process management tool is advantageous over other business process management tools, because it empowers the business process owner (e.g., a firm manager), with the ability to influence the priority that the actor places on individual tasks, thereby creating a mechanism which can be used to influence and improve the efficiency of business processes.

Figure 1:
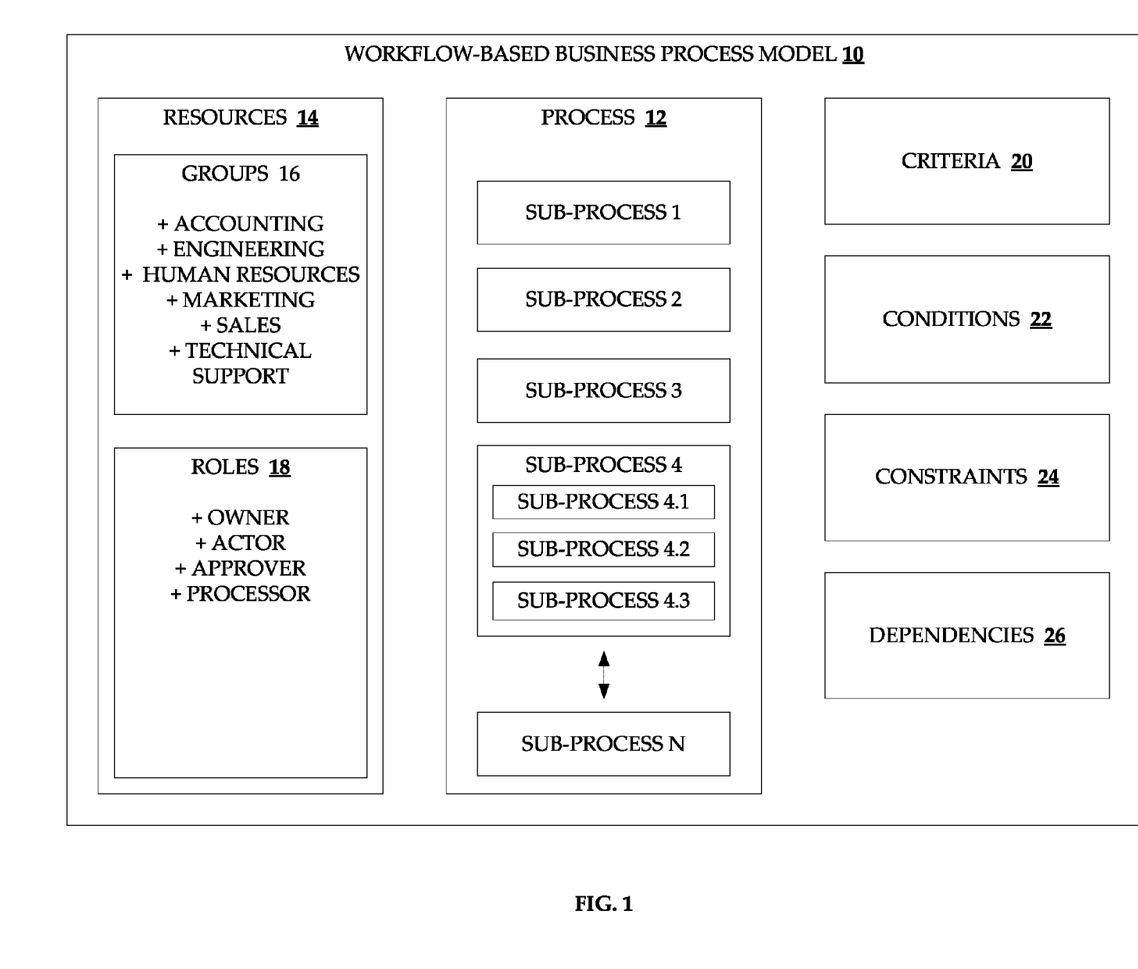
FIG. 1 illustrates an example of one model for a workflow-based business process, consistent with an embodiment of the invention.

FIG. 1 illustrates an example of a model 10, consistent with an embodiment of the invention, for modeling (e.g., defining) workflow-based business processes. As illustrated in FIG. 1, the workflow-based business process model 10 includes a variety of modeling elements used to define a workflow-based business process 12. These modeling elements may be used in addition to a process's beginning and end points, as well as any sub-processes that make up the business process, to model the particular workflow-based business process 12. For example, the model 10 illustrated in FIG. 1 includes among other modeling elements, firm resources 14.

In one embodiment of the invention, the firm resources 14 may be assigned to, or associated with, a particular workflow-based business process 12. Such resources 14 may include, for example, firm personnel (e.g., employees), machines and equipment, and other various firm assets. Accordingly, the resources 14 that may be assigned to a particular process 12 may be categorized, or organized, into functional groups 16 including, but not limited to: accounting, engineering, human resources, marketing, sales, and technical support.

In addition, each individual employee associated with a particular business process 12 may be assigned a particular role 18 with respect to one or more sub-processes of the particular business process 12. In one embodiment of the invention, the roles 18 that may be assigned to an individual include: owner, actor, approver, and processor. For example, in one embodiment of the invention, an individual employee may be assigned as the owner of a particular business process 12, in addition to being assigned as the actor, approver, or processor of one or more of the sub-processes that make up the particular business process 12.

In addition to various resources 14, the workflow-based business process model 10 illustrated in FIG. 1 also includes various criteria 18, conditions 20, constraints 22, and dependencies 24 that are used to define a particular business process 12. For example, in one embodiment of the invention, each sub-process that makes up the particular business process 12 may be associated with different criteria 18, conditions 20, constraints 22, and/or dependencies 24. In one embodiment of the invention, a dependency may define the relationship between sub-processes when, for example, one sub-process is dependent upon another.

It will be appreciated that the workflow-based business process model 10 illustrated in FIG. 1 is only one of many possible models. In particular, it will be appreciated that the present invention is in no way limited by the exact business process model 10 illustrated in FIG. 1, but instead, the present invention may be adapted to work with a wide variety of business process models, and the modeling tools (e.g., software applications) that implement those models to define particular workflow-based business processes.

Figures 2A, 2B:
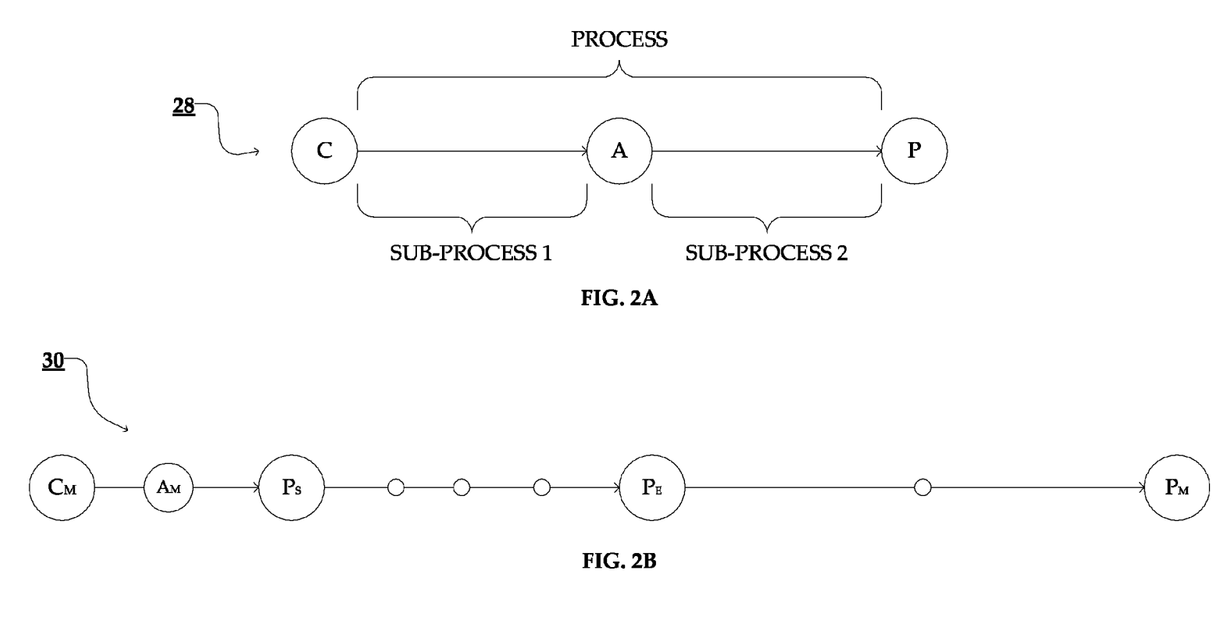
FIGS. 2A, 2B and 2C illustrate various workflow-based business processes, consistent with an embodiment of the invention.
Figure 2C:
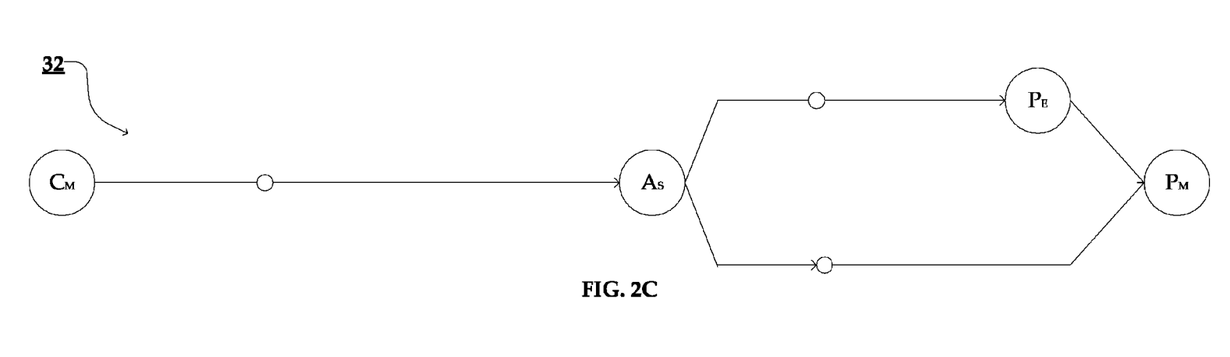

FIGS. 2A, 2B and 2C illustrate various workflow-based business processes, according to one embodiment of the invention. In FIG. 2A, a simple graph with edges and nodes is used to represent a workflow-based business process 28. The graph illustrated in FIG. 2A includes three nodes, labeled C, A, and P, respectively. In addition, the graph includes edges connecting the respective nodes.

According to one embodiment of the invention, each node represents a discreet point in time where the business process changes state. For example, each node may represent the point in time when one sub-process ends, and another sub-process begins. In a traditional paper-based process, this point in time may represent the time at which one paper form is completed and transferred to the next person for further action or processing. For example, referring again to FIG. 2A, the three nodes, labeled C, A, and P, may represent tasks for creating, approving, and processing a form, respectively. Accordingly, the edge C-A may represent the sum of work necessary for the form to be approved, both from a system point of view and a work-processing point of view. Similarly, the edge A-P may represent the sum of work necessary for the form request to be processed after approval. Therefore, the sum of the edges represented by C-A and A-P, or C-P, may represent the total amount of work necessary to complete the business process 28.

Like FIG. 2A, the graph shown in FIG. 2B represents a workflow-based business process 28. As illustrated in FIG. 2B, the business process 28 includes several nodes of varying size. In one embodiment of the invention, each large node represents a change in state involving a transfer between departments or groups. For example, each reference letter for a node may represent an action for the sub-process associated with the node (e.g., C for create, A for approve, and P for process), while the subscript reference letter may represent the functional group, or department (e.g., M for marketing, S for sales, E for engineering, etc.), responsible for the sub-process.

In one embodiment of the invention, for example, the business process 30 illustrated in FIG. 2B might represent a process for sending out marketing materials for a particular product. At the node labeled $C_M$, an employee in the marketing group may create a form, requesting the production and mailing of marketing materials for a particular product. The edge leading to the node labeled $A_M$ (e.g., the edge $C_M$-$A_M$), may represent the work required for a second employee in the marketing group to approve the request. Likewise, the edge leading to the node labeled $P_S$ (e.g., the edge $A_M$-$P_S$), may represent the sum of the work required of an employee in the sales group to provide a list of prior customers that may be interested in the particular product that is the subject of the marketing materials. The edge leading to the node labeled $P_E$ (e.g., the edge $P_S$-$P_E$), may represent the sum of the work required by several engineers in the engineering group to determine product specifications to be printed in the marketing materials. Finally, the last edge (e.g., the edge $P_E$-$P_M$), leading to the node labeled with a $P_M$, may represent the sum of the work required for a member of the marketing group to organize the information, print the marketing materials, and mail the marketing materials to the potential customers. Each small node without any reference letter may represent the end and beginning of a process (e.g., a separate task or work item) within a process. For example, as illustrated in FIG. 1, sub-process 4 is further divided into sub-processes 4.1, 4.2, 4.3 and 4.4. Accordingly, the three small nodes between the nodes $P_S$ and $P_E$ in FIG. 2B may represent the end points for the four sub-processes that make up sub-process 4 in FIG. 1.

FIG. 2C illustrates yet another graph representing a business process 32. In FIG. 2C, the business process 32 includes sub-processes that are to be performed in parallel. For example, the edge between $A_S$ and $P_E$ (e.g., the edge $A_S$-$P_E$) represents a sub-process that may be performed in parallel with the sub-process represented by the edge between $A_S$ and $P_M$ (e.g., the edge $A_S$-$P_M$).

In one embodiment of the invention, a metric may be applied to each edge shown in the business processes illustrated in FIGS. 2A, 2B and 2C, and accordingly, a form of cost measure may be calculated based on the metric. For example, in one scenario, each edge may be assigned a base cost in addition to a variable cost per unit of time. Accordingly, as will be described in greater detail below, at any given time, a cost for each process or work item may be calculated.

Again, it will be appreciated that the business processes 28, 30 and 32 illustrated in, and described with reference to, FIGS. 2A, 2B and 2C are provided as examples. The present invention may be adapted to work with innumerable business processes, which may be modeled and defined in a variety of ways.

Figure 3:
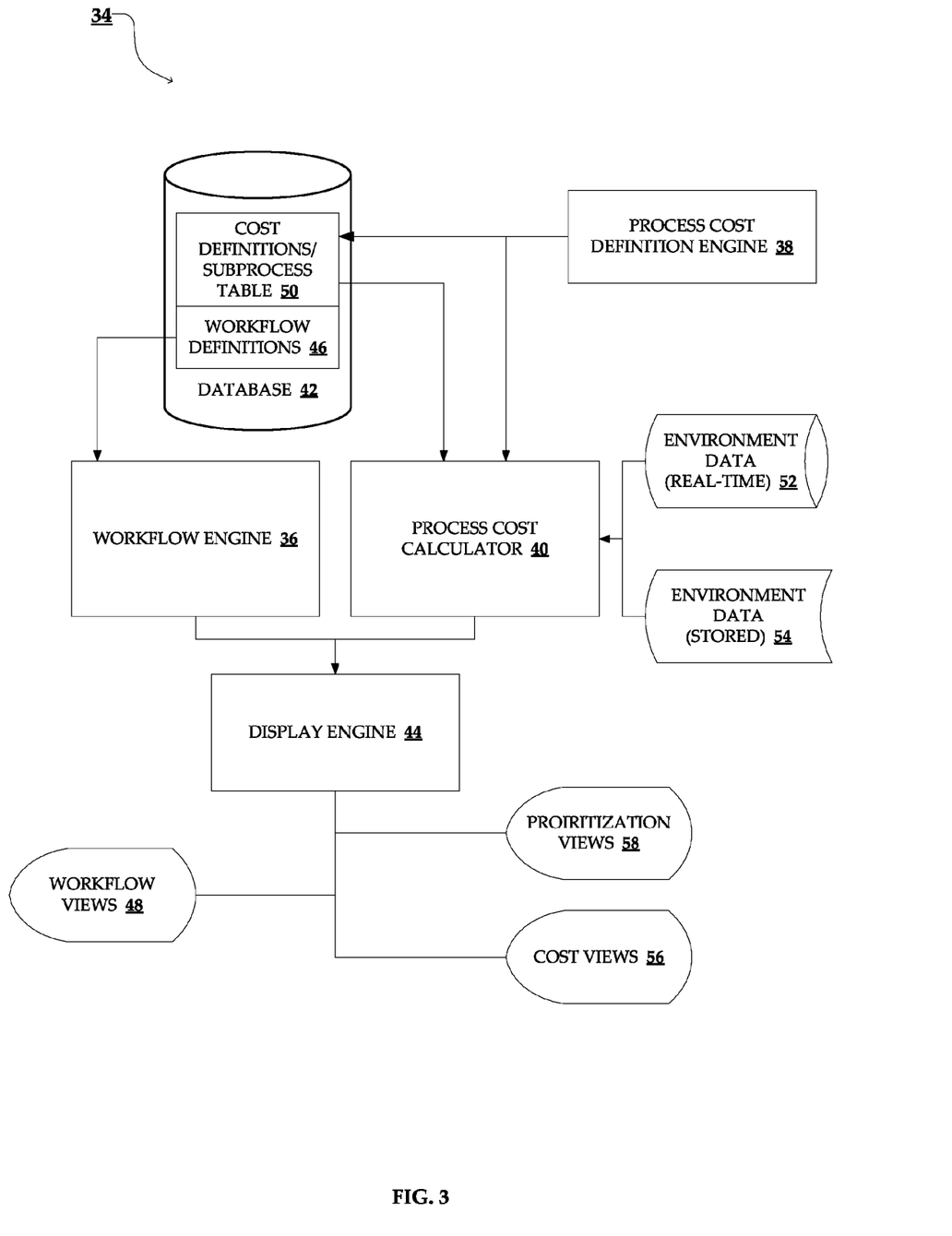
FIG. 3 illustrates a block diagram showing the various functional components of a system for monitoring and fine tuning a workflow-based business process, consistent with one embodiment of the invention.

FIG. 3 illustrates a block diagram showing the various functional components of a system 34 for monitoring and fine-tuning, a workflow-based business process, according to one embodiment of the invention. As illustrated in FIG. 3, the system 34 includes a workflow engine 36, a process cost definition engine 38, and a process cost calculator 40, which are all interconnected with a database 42. In addition, the system 34 includes a display engine 44 for generating a variety of user views, allowing users to visually interact with the system.

The workflow engine 36 may process workflow definitions 46 stored in the database 42 to generate a variety of workflow views 48 presented to the user. For example, according to one embodiment of the invention, a workflow definition 46 may be a business process that has been defined according to the business process model used by the workflow engine 36. Accordingly, based on a particular workflow definition 46, the workflow engine 36, in conjunction with the display engine 44, may display different data associated with one or more processes (e.g., tasks or work items) to personnel assigned to the particular workflow. In one embodiment of the invention, a separate workflow definition creation tool (not shown) is used to create workflow definitions.

In one embodiment of the invention, the workflow engine 36 may be a software application, such as *SAP Business Workflow*, from SAP AG of Walldorf, Germany. Accordingly, in one embodiment of the invention, the process cost definition engine 38 and the process cost calculator 40 may be add-on components that are integrated to work with the workflow engine 36. However, It will be appreciated that the present invention is equally adaptable to a wide variety of workflow engines. Furthermore, in one embodiment, the process cost definition engine 38 and the process cost calculator 40 are tightly integrated with the workflow engine, as opposed to add-on components.

The process cost definition engine 38, as the name suggests, facilitates defining the cost for each process, or sub-process (e.g., task or work item), that is part of a particular business process as defined by a particular workflow definition 46. For example, the process owner may utilize the process cost definition engine 38 to assign a variable cost function 50, or cost definition, to each sub-process that is part of a particular workflow definition 46. In one embodiment of the invention, the cost function 50 may reflect the urgency, or importance, of the sub-process to the enterprise, as determined by the process owner. However, in an alternative embodiment, the cost definition may reflect an actual monetary value. In either case, the system provides a mechanism by which the efficiency of a business process may be measured. For example, in one embodiment of the invention, the efficiency may be expressed as a ratio of the amount of a business process completed to work spent on the business process. Furthermore, the variable cost function 50 may be defined in terms of real-time environment data 52, or previously stored environment data 54, which may be stored in the database 42.

In one embodiment of the invention, the process cost calculator 40 may calculate a cost for a particular sub-process based on the process cost function associated with the sub-process. For example, at any given time, a user of the system (e.g., a business process owner or a business process actor) may select, via a user interface, to view the cost of one or more work items to which the user has been assigned. Accordingly, the process cost calculator 40 may retrieve data (e.g., workflow definition 46 and cost function data 50) from the database 42 to generate a cost for the particular process, or work item selected, based on the cost function associated with the selected process or work item. The process cost calculator may substitute real-time 52, or stored environment data 54 for variables in the cost function. Once a cost has been calculated, the display engine 44 of the system 34 communicates the cost calculation to a user in one of several customized cost views 56.

In addition to processing costs, in one embodiment of the invention, the process cost calculator 40 facilitates the prioritization of work items assigned to an individual actor, or to a group of actors such as functional departments (e.g., sales department, marketing department, engineering department, etc.). For example, in one embodiment of the invention, the process cost calculator 40 compares a cost calculation for a particular process or work item to a lower and upper threshold. Based on the relative cost of the particular work item, the work item may be ranked, or prioritized. Accordingly, the display engine 44 of the system 34 may communicate to a user a variety of prioritization views 58, showing the relative importance, from the perspective of the process owner, of a particular process or work item.

Figure 4:
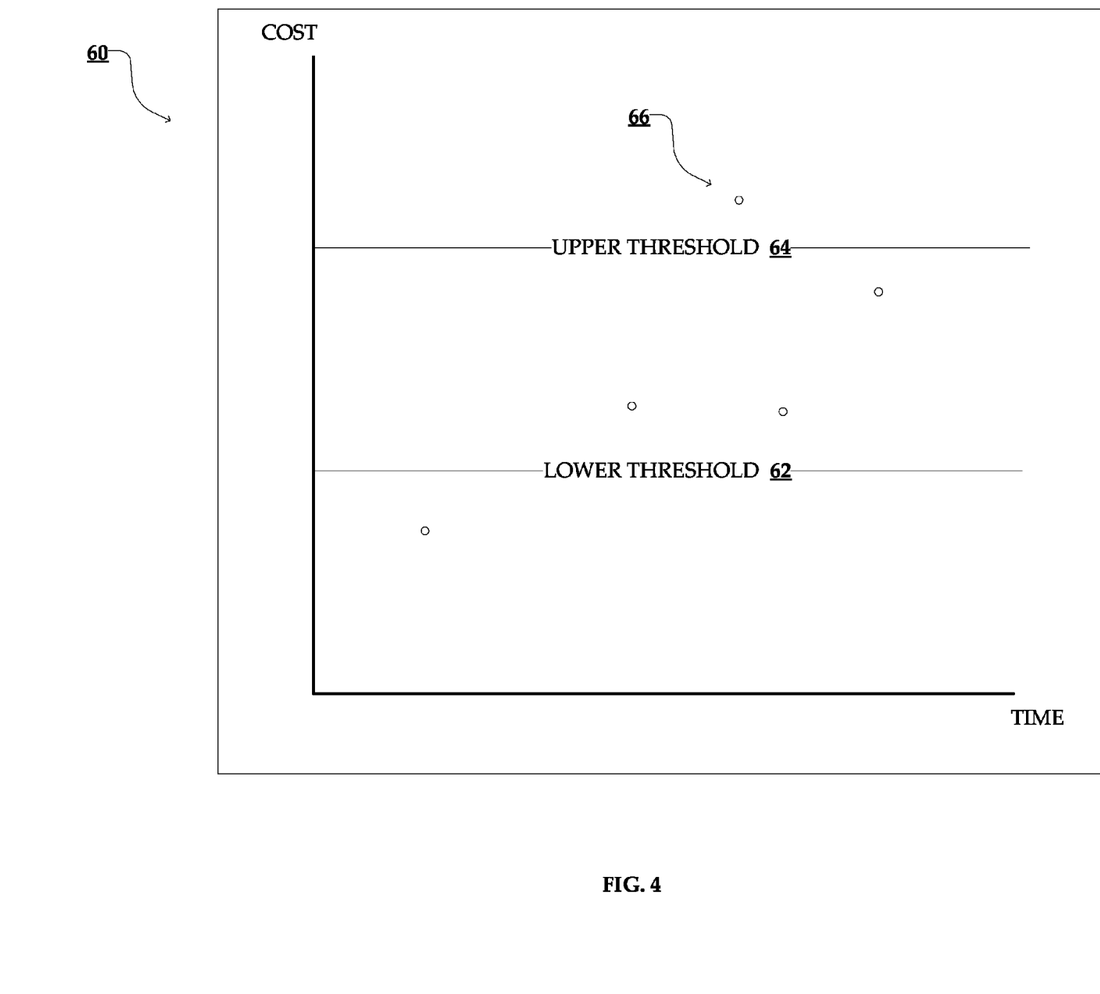
FIG. 4 illustrates a scatter graph showing the costs for various business processes, or work items, over a particular period of time, according to one embodiment of the invention.

FIG. 4 illustrates a scatter graph 60 showing the costs for various business processes, or work items, over a particular period of time. As illustrated in FIG. 4, the X-axis represents cost, and the Y-axis represents time. Therefore, each circle on the graph represents the cost, at a given time, of a particular sub-process, or work item, for a business process. In addition, FIG. 4 includes a lower threshold line 62, and an upper threshold line 64. In one embodiment of the invention, the threshold lines 62 and 64 are determined by the process owner. Alternatively, the threshold lines may be automatically established based on historical data about the particular business processes to which each threshold line relates.

In one embodiment of the invention, when the process cost calculator 40 calculates a cost based on a cost function 56 in the database 42, the process cost calculator 40 compares the calculated cost to the lower and upper thresholds 62 and 64. If, for example, the calculated cost is greater than the upper threshold 64, as suggested by the work item represented by the circle with reference number 62 in FIG. 4, then the system can communicate the high priority of the particular work item to the employees assigned to the work item (e.g., the work item's owner and actor). Based on the prioritization analysis performed by the process cost calculator 40, the display engine may generate and display a wide variety of views to the owners and actors assigned to the different work items.

Figure 5:
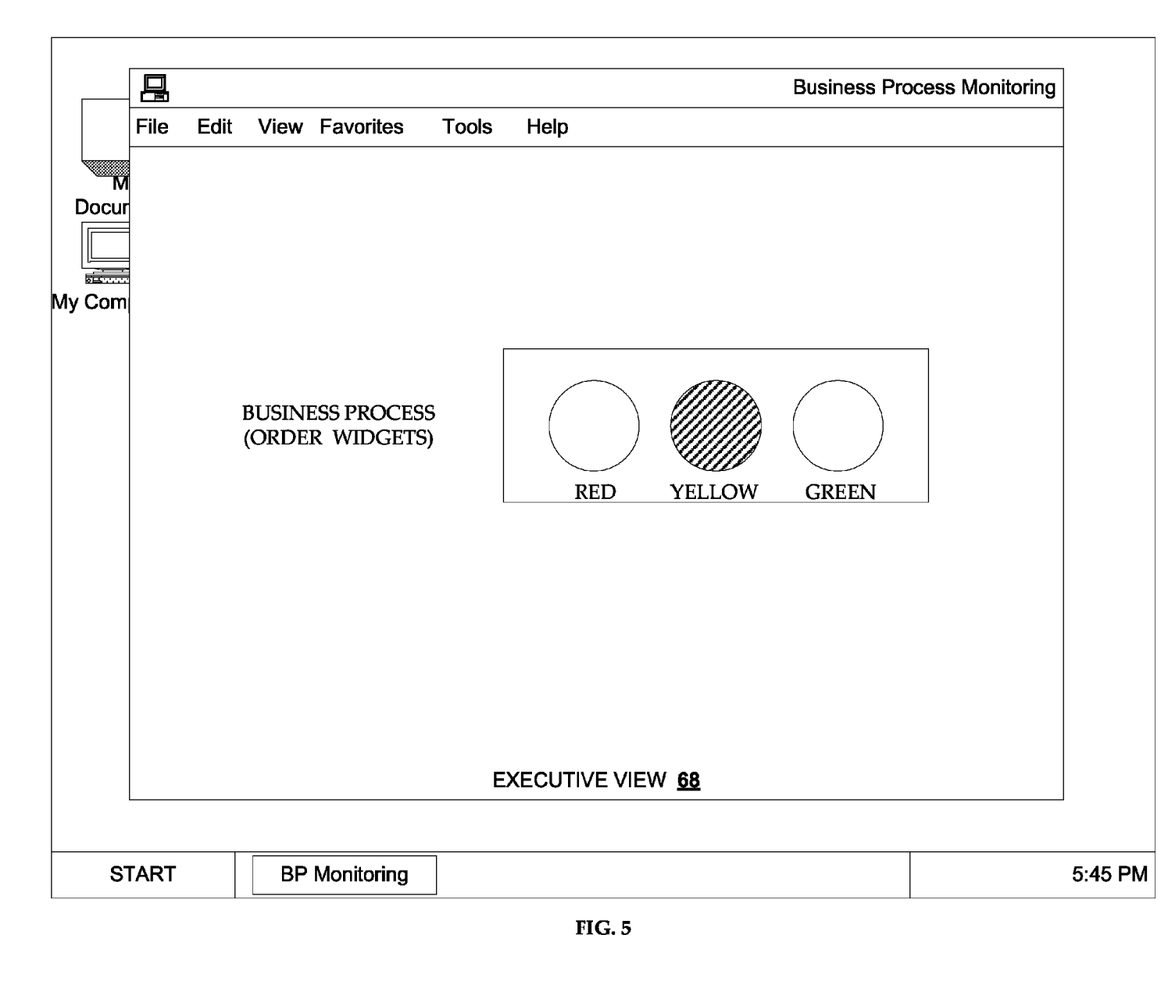
FIG. 5 illustrates an example of an executive view of a business process for ordering widgets, according to one embodiment of the invention.

For example, FIG. 5 illustrates an executive view 68 of a business process for ordering widgets. As an executive view 68, the view may be communicated to the business process owner. Accordingly, the view 68 may communicate to the business process owner the level of efficiency for the business process, and in particular, for each actor, or department, assigned to the process. It will be appreciated that the particular views illustrated in FIGS. 5 through 8 have been provided as examples, and the data managed by the invention may be communicated to users of the system in a wide variety of views.

The executive view 68 shown in FIG. 5 includes three process indicators, which may be thought of as synonymous with the red, green and yellow lights of a traffic light indicator. For example, each process indicator, when active, represents a different status, or level of efficiency, for the particular business process. As illustrated in FIG. 5, the middle, yellow indicator is active. In one embodiment of the invention, the yellow indicator is active when the calculated cost for the process or work item falls between the upper and lower cost threshold lines 62 and 64 shown in FIG. 4. This suggests that the cost of the business process is within the normal business parameters, as setup by the process owner. Similarly, in one embodiment of the invention, a green indicator is activated when the calculated cost for the process falls below the lower threshold line 62 of FIG. 4, indicating that the cost for that particular business process is low. Finally, for one embodiment of the invention, a red process indicator is activated when the calculated cost for the process is higher than the upper threshold line 64 shown in FIG. 4.

In one embodiment of the invention, the system is configured to allow the process owner to drill down and view further details about the efficiency level of a particular process by, for example, viewing further details about the business process. For example, in one embodiment of the invention, the process owner may select the business process for ordering widgets by, for example, clicking on the visual indicator for the process. In response the system 34 may generate a view showing a more detailed level of granularity for the business process. For example, by clicking on the visual indicator for the business process for ordering widgets as shown in FIG. 5, the business process owner may be presented with the detailed executive view 70 shown in FIG. 6.

Figure 6:
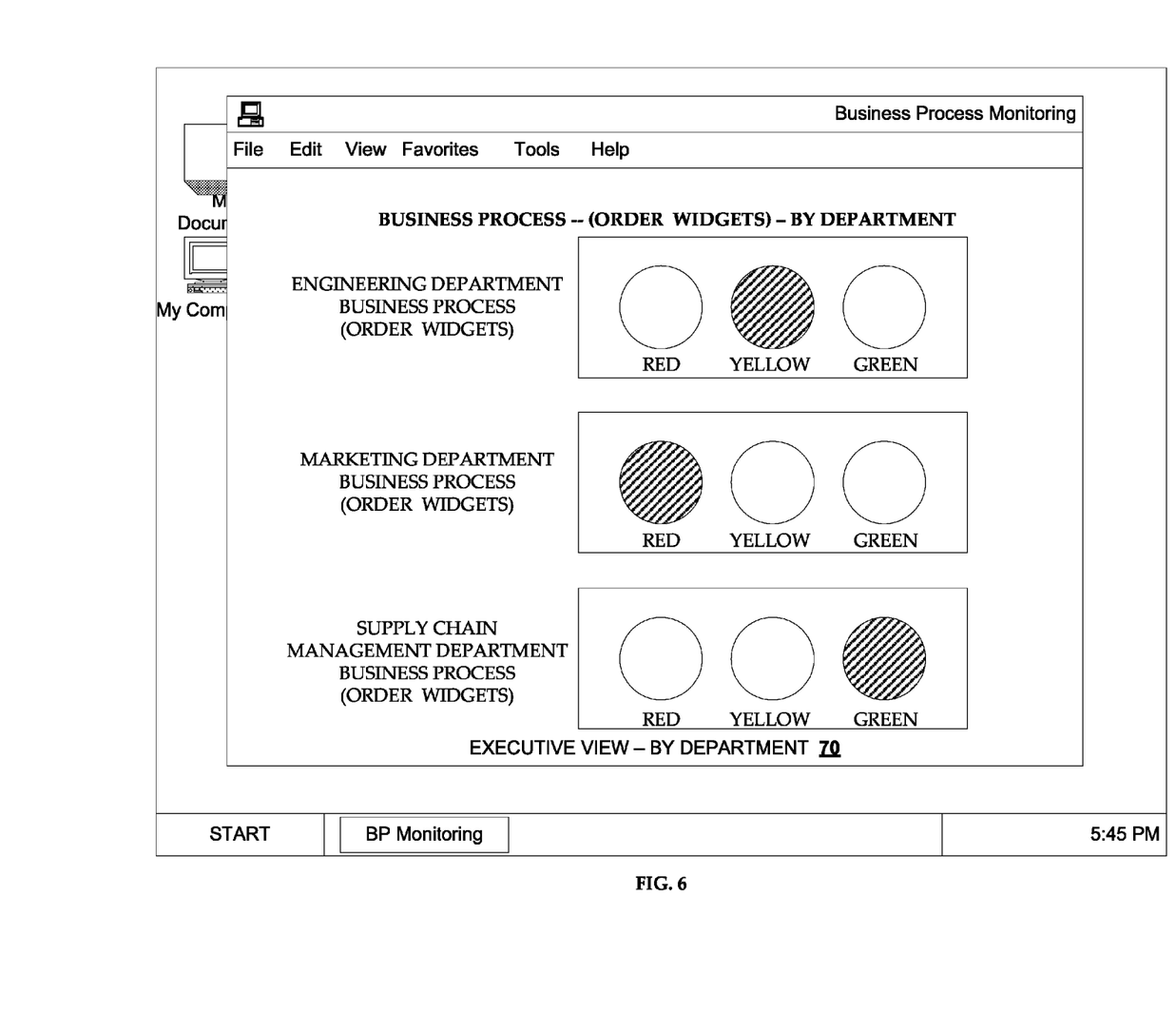
FIG. 6 illustrates an example of a detailed executive view, according to one embodiment of the invention, of a business process for ordering widgets, broken down by department.

FIG. 6 illustrates a detailed executive view 70, according to one embodiment of the invention, of a business process for ordering widgets, broken down by department. In FIG. 6, a process indicator is shown for each department that has been assigned to a work item associated with the business process for ordering widgets. Accordingly, each process indicator reflects the overall level of efficiency for the particular department for the particular business process (e.g., ordering widgets). For example, as illustrated in FIG. 6, the executive view 70 shows an active yellow indicator for the engineering department, an active red indicator for the marketing department, and an active green indicator for the supply chain management department, for the business process for ordering widgets.

Figure 7:
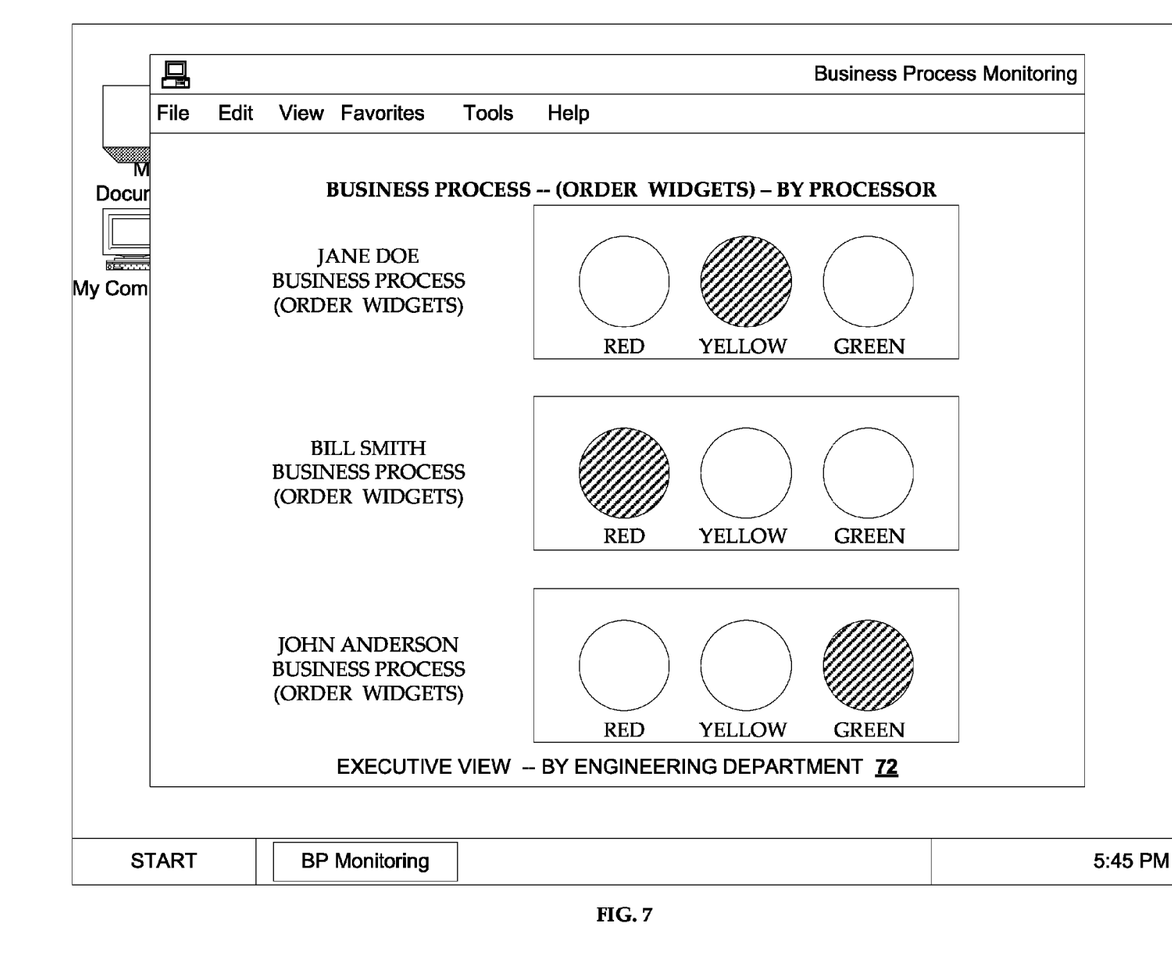
FIG. 7 illustrates an example of a detailed executive view, according to one embodiment of the invention, of a business process for ordering widgets, broken down by personnel within the engineering department.

In one embodiment of the invention, by selecting (e.g., clicking on) any one set of process indicators illustrated in FIG. 6, the process owner can view yet another level of detail about the efficiency of the business process. For example, FIG. 7 illustrates a detailed executive view 72, according to one embodiment of the invention, of a business process for ordering widgets, broken down by personnel with the engineering department. As illustrated in FIG. 7, each individual process actor that has been assigned a work item for the business process for ordering widgets is displayed along with a process indicator, indicating the relative cost of the process to which each individual has been assigned. In this way, the business process owner may determine which individuals are the least efficient and require skills training for the particular process.

Figure 8:
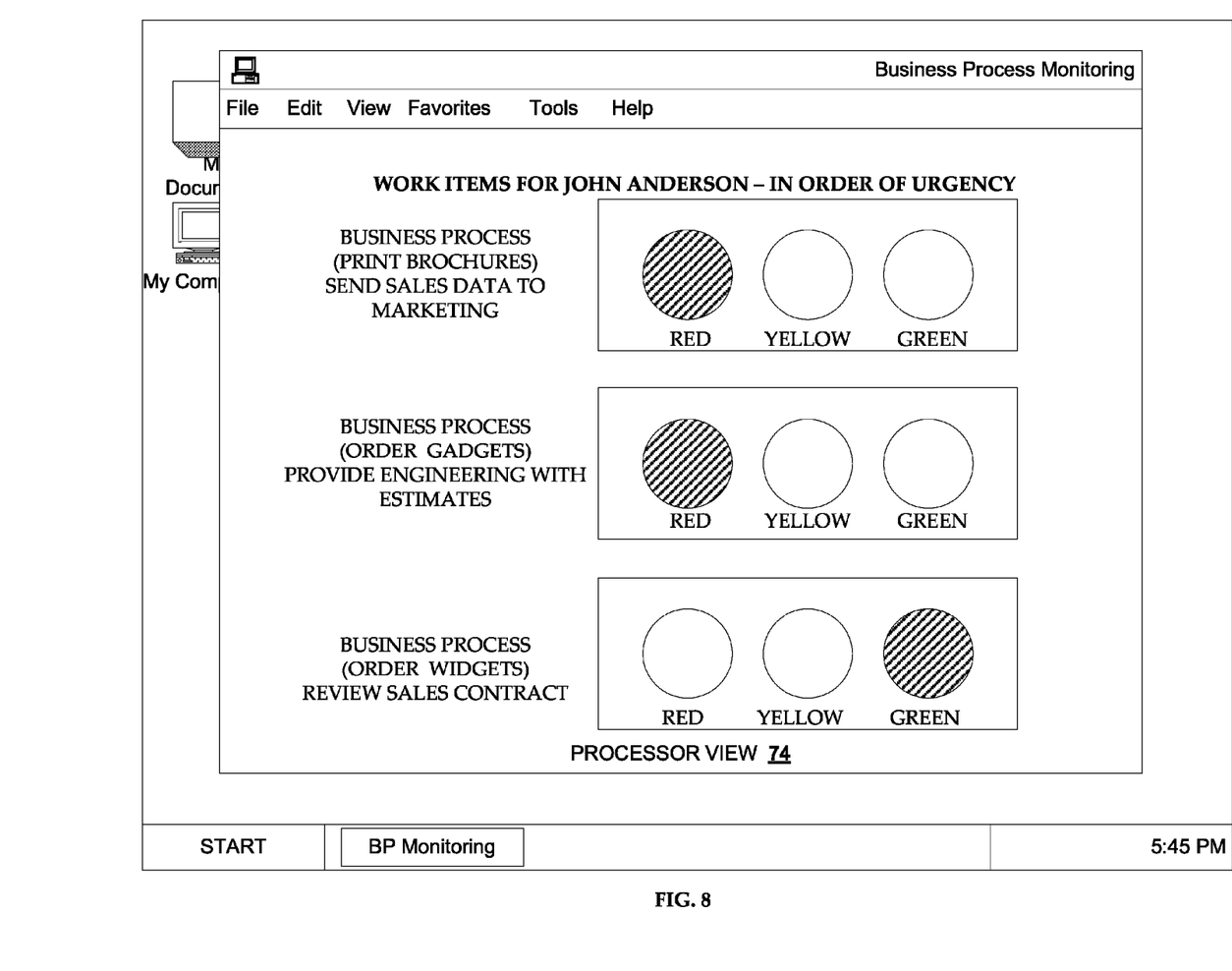
FIG. 8 illustrates an example of a processor view, according to one embodiment of the invention, showing all of the work items assigned to an individual processor along with process indicators for each work item.

In addition to generating executive views for the process owner, in one embodiment of the invention, the system generates processor views for each individual processor assigned to a work item of the business process as well. For example, FIG. 8 illustrates an example of a processor view 74, according to one embodiment of the invention, showing all of the work items assigned to an individual by the name of John Anderson, along with process indicators for each work item. As illustrated in FIG. 8, three work items for three different business processes are shown. For example, the top work item—"send sales data to the marketing department"—is part of a business process for printing brochures. Similarly, a work item for providing the engineering department with estimates for the business process for ordering gadgets is shown, as well as a work item for reviewing sales contracts for the business process for ordering widgets. Along with each particular work item is shown a process indicator, which communicates to the processor (e.g., John Anderson) the overall importance of each task from the view of the business process owner. Accordingly, the individual actor, in this case John Anderson, is provided with a view of the work items prioritized by importance to the firm. As illustrated in FIG. 8, the two work items shown on top have active red indicators to indicate their high level of importance, while the task at the bottom (e.g., "REVIEW SALES CONTRACTS") has a green active indicator suggesting an overall low level of importance.

Figure 9:
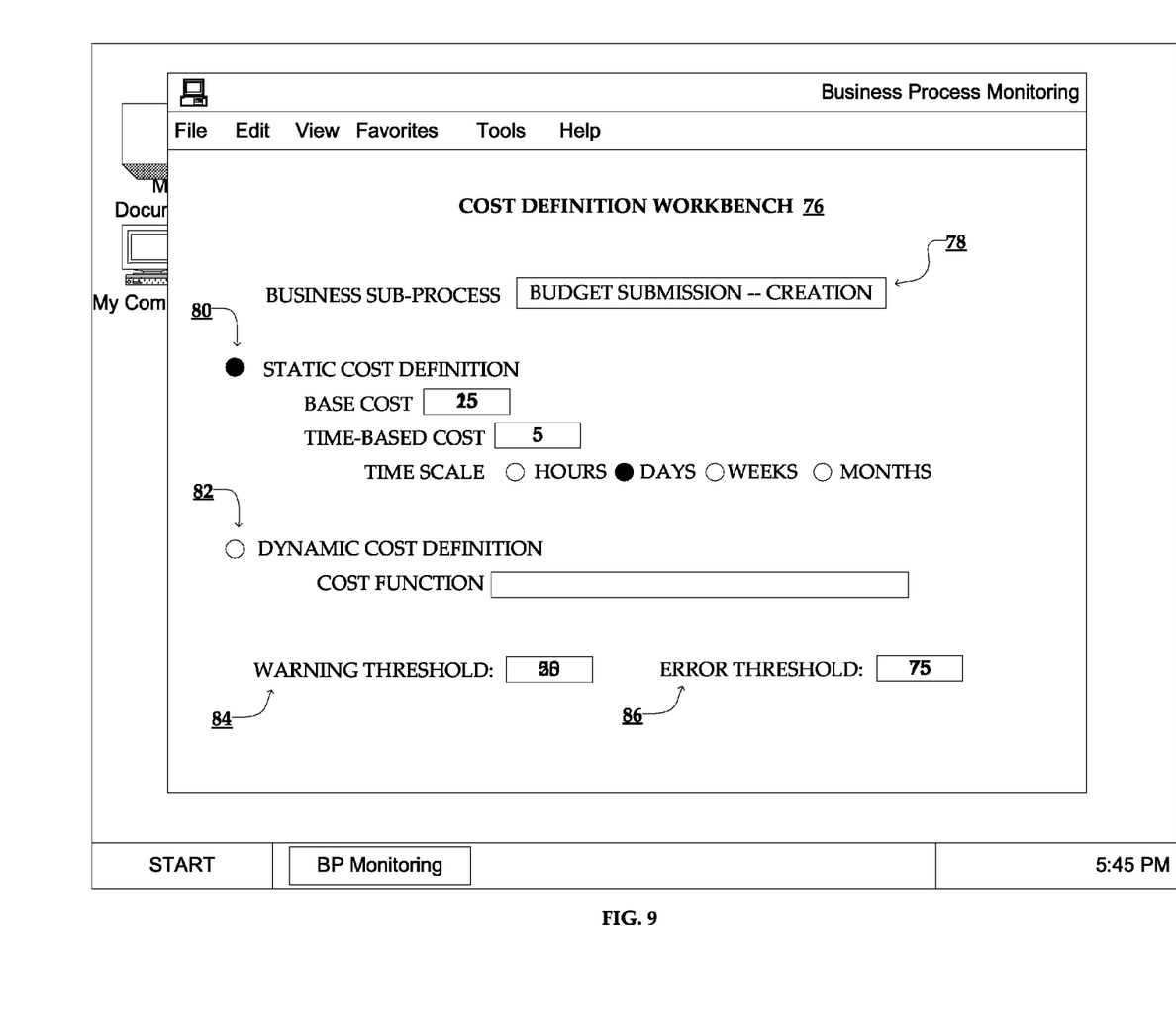
FIG. 9 illustrates a cost definition workbench view; according to one embodiment of the invention, for defining a process cost definition associated with a process or a sub-process.

FIG. 9 illustrates a cost definition workbench view 76, according to one embodiment of the invention, for defining a process cost definition associated with a process, or sub-process. As illustrated in FIG. 9, in one embodiment of the invention, a cost definition workbench view 76 may facilitate defining a cost function for a particular process, or sub-process. As illustrated in FIG. 9, a process owner may provide a name for the particular sub-process for which the process owner would like to provide a cost definition. For example, in FIG. 9, the "BUSINESS SUB_PROCESS" 78 field may allow the process owner to enter, or select from a list, the name of a particular sub-process. In one embodiment of the invention, a cost definition may be dynamic or static. For example, as illustrated in FIG. 9, the cost definition interface may prompt the process owner to select between a static cost definition 80, or a dynamic cost definition 82. If a static cost definition is selected, the process owner may be prompted to provide a base cost (e.g., 15 in FIG. 9), as well as a time-based cost, and a time scale for the time-based cost. If, however, the process owner selects a dynamic cost definition, the process owner may select, or provide, a custom cost function. In either case, in one embodiment of the invention, the process owner may select the lower 84 and upper thresholds 86 when defining the cost definition for a particular sub-process.

Figure 10:
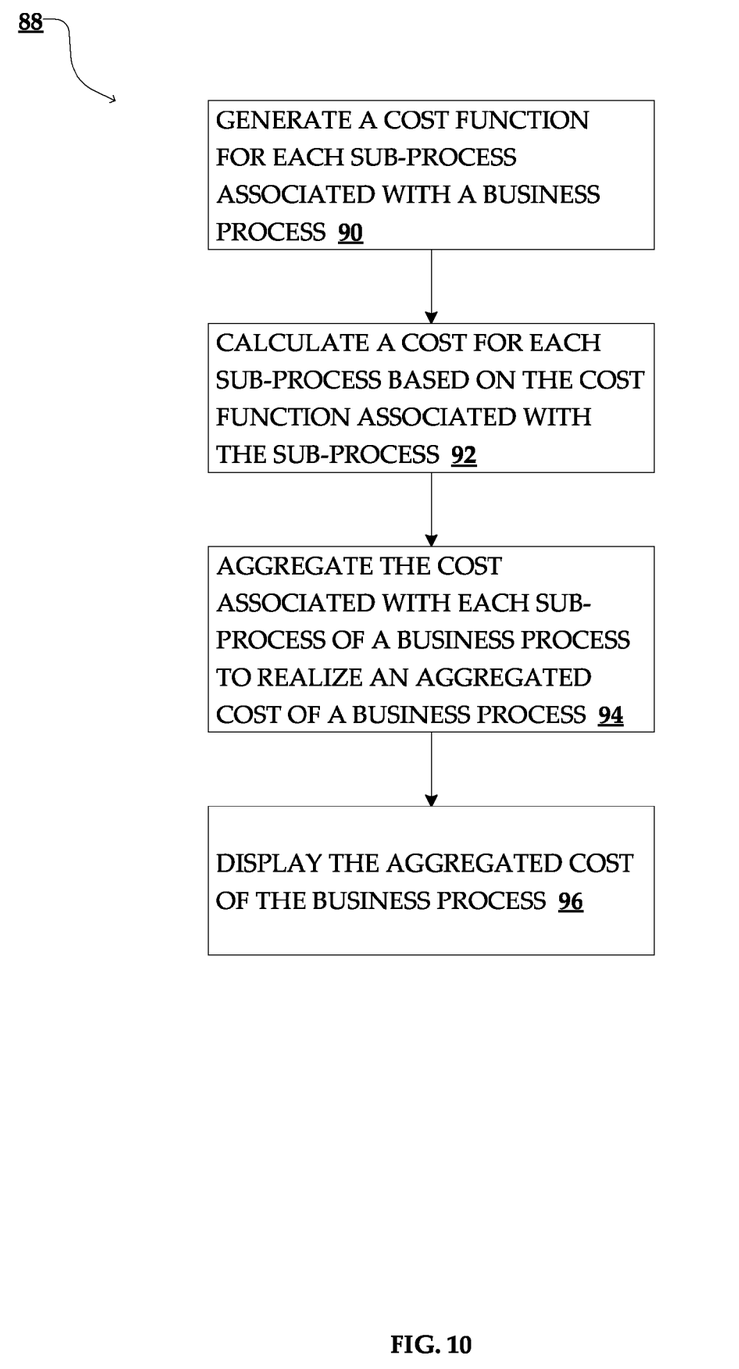
FIG. 10 illustrates the operations, according to one embodiment of the invention, for a method for monitoring and fine-tuning a business process.

FIG. 10 illustrates the operations, according to one embodiment of the invention, for a method 88 for monitoring and fine-tuning a business process. At operation 90, a cost definition is generated for each sub-process associated with a business process. At operation 92, a cost for each sub-process is calculated based on the cost definition associated with the sub-process in operation 90. At operation 94 the cost associated with each sub-process of a business process is aggregated to realize an aggregated cost of a business process. Finally, at operation 96, the aggregated cost of the business process is displayed. In an alternative embodiment of the invention, the costs are aggregated and displayed for each organizational unit within an enterprise, or, for each individual within an organizational unit.

Figure 11:
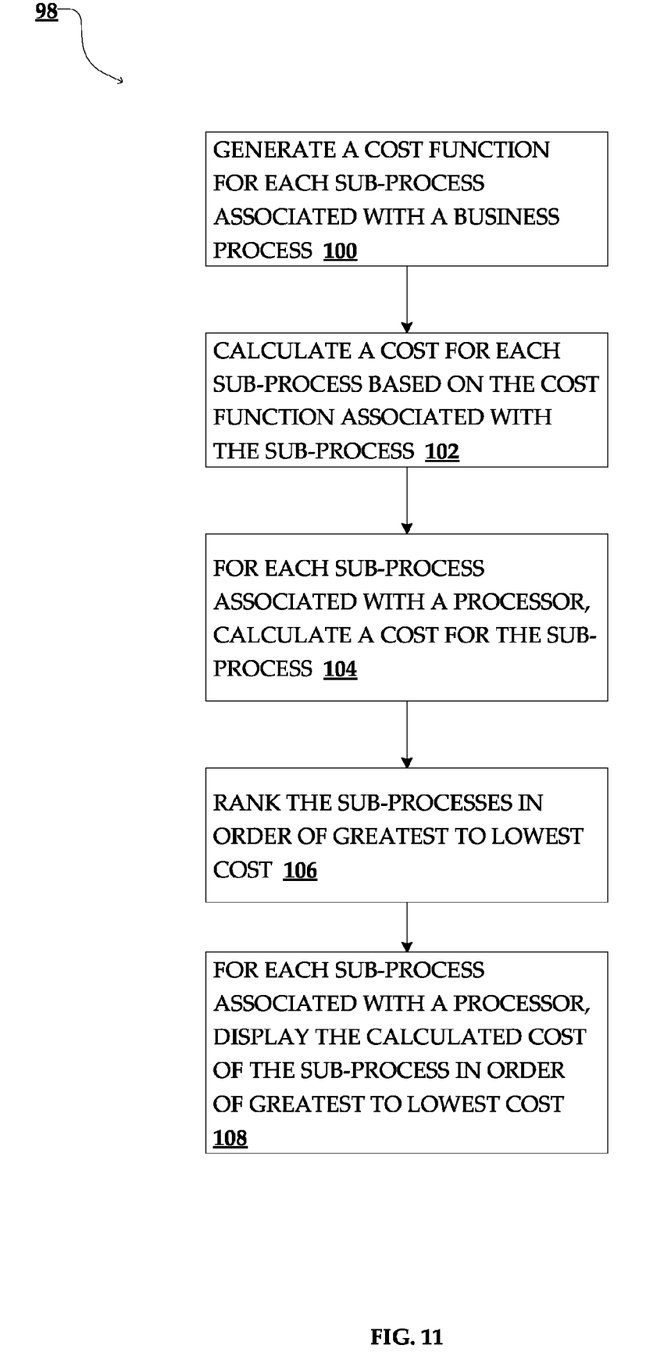
FIG. 11 illustrates the operations, according to another embodiment of the invention, for a method 86 for monitoring a business process.

FIG. 11 illustrates the operations, according to another embodiment of the invention, for a method 98 for monitoring a business process. Similar to the method 88 illustrated in FIG. 10, at operations 100 and 102 a cost function, or definition, is generated for each sub-process associated with a business process, and then a cost is calculated, based on that cost function. At operation 104, for each sub-process, or work item, associated with an individual work item processor, a cost is calculated. At operation 106, the calculated costs for each of the sub-processes are ranked from highest to lowest. At operation 108, the sub-processes are displayed to the individual processor in order of highest to lowest cost.

Thus, a method and system for monitoring and fine-tuning a business process have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A system comprising:
a processor;
a process priority definition engine, executed via the processor, to generate a priority definition for each of a plurality of sub-processes of a business process, wherein each priority definition is a function of real-time data and includes at least one threshold value; and
a process urgency calculator, executed via the processor, to calculate a priority for each of the plurality of sub-processes based on a cost of the respective sub-process and the respective priority definition, and to aggregate the priorities of each of the plurality of sub-processes to determine an aggregated priority of the business process; and
a display engine, executed via the processor, to generate a display for an owner of the business process and a display for an owner of at least one of the plurality of sub-processes, wherein the display for the owner of the business process includes
a display of a representation of the aggregated priority of the business process, and
a hierarchical display of a representation of the priority for each of the plurality of sub-processes, the representation of the priority of each of the plurality of sub-processes to be hierarchically displayed based on the association between each sub-process and the business process, and
wherein the display for the owner of at least one of the plurality of sub-processes is based, at least in part, on the priority of the at least one sub-process and wherein a display of a representation of the aggregated priority of the business process indicates the whether the cost of at least one of the plurality of sub-processes is higher than its respective at least one threshold value.

2. The system of claim 1, wherein each priority definition is further a function of data related to an environment executing the business process.

3. The system of claim 1, wherein the business process is executed via an enterprise, the enterprise to include a plurality of organizational units, wherein, for each organizational unit of the enterprise, the process urgency calculator is to aggregate the priorities for all sub-processes associated with a particular organizational unit, and the display engine is to display the aggregated priority for each organizational unit.

4. The system of claim 3, further comprising:
a processor assigned to a sub-process within an organizational unit of the enterprise, the process urgency calculator is to aggregate the priorities for all sub-processes assigned to the processor, and the display engine is to display the aggregated priority for the processor within the organizational unit of the enterprise.

5. The system of claim 4, wherein the display engine is to display the priority for each sub-process assigned to the processor in the order of greatest to lowest priority.

6. A processor-implemented method comprising:
generating, by the processor, a priority definition for each of a plurality of sub-processes of a business process associated with a business process, wherein each priority definition is a function of real-time data and includes at least one threshold value;
calculating, by the processor, a priority for each of the plurality of sub-processes based on a cost of the respective sub-process and the at least one threshold value of the respective priority definition;
aggregating, by the processor, the priorities of each of the plurality of sub-processes to determine an aggregated priority of the business process; and
generating, by the processor, a display for an owner of the business process and a display for an owner of at least one of the plurality of sub-processes, wherein the display for the owner of the business process includes
a display of a representation of the aggregated priority of the business process, and
a hierarchical display of a representation of the priority for each of the plurality of sub-processes, the representation of the priority of each of the plurality of sub-processes to be hierarchically displayed based on the association between each sub-process and the business process, and
wherein the display for the owner of at least one of the plurality of sub-processes is based, at least in part, on the priority of the at least one sub-process and wherein a display of a representation of the aggregated priority of the business process indicates the whether the cost of at least one of the plurality of sub-processes is higher than its respective at least one threshold value.

7. The method of claim 6, wherein each priority definition is further a function of data related to an environment executing the business process.

8. The method of claim 7, wherein the business process is executed via an enterprise, the enterprise to include a plurality of organizational units, the method further comprising:
for each organizational unit of the enterprise, aggregating the priorities of all sub-processes associated with the organizational unit; and
displaying a representation of the aggregated priority of all sub-processes associated with each organizational unit of the enterprise.

9. The method of claim 6, wherein the business process is executed via a plurality of processors, and the method further comprises:
for each processor, aggregating the priorities of all sub-processes associated with the processor; and
displaying a representation of the aggregated priority for each of the plurality of processors.

10. The method of claim 7, further including:
prior to displaying the calculated priority for each sub-process associated with one of the plurality of processors, ranking the sub-processes based on the priority of each sub-process within the business process; and for each sub-process associated with the one of the plurality of processors, displaying the calculated priority of the sub-process based on the ranking.

11. A non-transitory machine-readable medium embodying a set of instructions, the instructions, when executed by a machine, cause the machine to:
generate a priority definition for each of a plurality of sub-processes of a business process associated with a business process, wherein each priority definition is a function of real-time data and includes at least one threshold value;
calculate a priority for each of the plurality of sub-processes based on a cost of the respective sub-process and the at least one threshold value of the respective priority definition;
aggregate the priorities of each of the plurality of sub-processes to determine an aggregated priority of the business process; and
generate a display for an owner of the business process and a display for an owner of at least one of the plurality of sub-processes, wherein the display for the owner of the business process includes
a display of a representation of the aggregated priority of the business process, and
a hierarchical display of a representation of the priority for each of the plurality of sub-processes, the representation of the priority of each of the plurality of sub-processes to be hierarchically displayed based on the association between each sub-process and the business process, and
wherein the display for the owner of at least one of the plurality of sub-processes is based, at least in part, on the priority of the at least one sub-process and wherein a display of a representation of the aggregated priority of the business process indicates the whether the cost of at least one of the plurality of sub-processes is higher than its respective at least one threshold value.

12. The machine-readable medium of claim 11, wherein the business process is executed via an enterprise, the enterprise to include a plurality of organizational units, the medium including further instructions that, when executed by a machine, cause the machine to:
for each organizational unit of the enterprise, aggregate the priorities of all sub-processes associated with the organizational unit; and
display a representation of the aggregated priority of all sub-processes associated with the organizational unit of the enterprise.

13. The machine-readable medium of claim 12, wherein the business process is executed via a plurality of processors, and the medium including further instructions that, when executed by a machine, cause the machine to:
for each organizational unit of the enterprise, aggregate the priorities of all sub-processes associated with the organizational unit; and
display a representation of the aggregated priority of all sub-processes associated with each organizational unit of the enterprise.

14. A system comprising:
means for generating a priority definition for each of a plurality of sub-processes of a business process associated with a business process, wherein each priority definition is a function of real-time data and includes at least one threshold value;
means for calculating a priority for each of the plurality of sub-processes based on a cost of the respective sub-process and the at least one threshold value of the respective priority definition;
means for aggregating the priorities of each of the plurality of sub-processes to determine an aggregated priority of the business process; and
means for generating a display for an owner of the business process and a display for an owner of at least one of the plurality of sub-processes, wherein the display for the owner of the business process includes
a display of a representation of the aggregated priority of the business process, and
a hierarchical display of a representation of the priority for each of the plurality of sub-processes, the representation of the priority of each of the plurality of sub-processes to be hierarchically displayed based on the association between each sub-process and the business process, and
wherein the display for the owner of at least one of the plurality of sub-processes is based, at least in part, on the priority of the at least one sub-process and wherein a display of a representation of the aggregated priority of the business process indicates the whether the cost of at least one of the plurality of sub-processes is higher than its respective at least one threshold value.

15. The system of claim 14, wherein each priority definition is further a function of data related to an environment executing the business process.

16. The system of claim 14, wherein the business process is executed via an enterprise, the enterprise to include a plurality of organizational units, the system further including:
for each organizational unit of the enterprise, means for aggregating the priorities of all sub-processes associated with the organizational unit; and
means for displaying a representation of the aggregated priority of all sub-processes associated with each organizational unit of the enterprise.

17. The system of claim 14, wherein the business process is executed via a plurality of processors, and the system further including:
for each processor, means for aggregating the priorities of all sub-processes associated with the processor; and
means for displaying a representation of the aggregated priority for each of the plurality of processors.

18. The system of claim 17 further including:
prior to displaying the calculated priority for each sub-process associated with one of the plurality of processors, means for ranking the sub-processes based on the priority of each sub-process within the business process; and
for each sub-process associated with the one of the plurality of processors, means for displaying the calculated priority of the sub-process based on the ranking.

* * * * *